United States Patent
Kim et al.

(10) Patent No.: US 12,063,404 B2
(45) Date of Patent: Aug. 13, 2024

(54) SERVER FOR GENERATING USER-CUSTOMIZED COMMUNITY LIST FOR USER DEVICE, AND OPERATING METHOD OF THE SERVER

(71) Applicant: SAMSUNG ELECTRONICS CO., LTD., Suwon-si (KR)

(72) Inventors: Dosung Kim, Suwon-si (KR); Hyejin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/120,853

(22) Filed: Mar. 13, 2023

(65) Prior Publication Data

US 2023/0291953 A1 Sep. 14, 2023

Related U.S. Application Data

(63) Continuation of application No. PCT/KR2023/002863, filed on Mar. 2, 2023.

(30) Foreign Application Priority Data

Mar. 8, 2022 (KR) .................... 10-2022-0029467

(51) Int. Cl.
*H04N 21/4788* (2011.01)
*H04N 21/25* (2011.01)
(Continued)

(52) U.S. Cl.
CPC ....... *H04N 21/2668* (2013.01); *H04N 21/252* (2013.01); *H04N 21/25891* (2013.01); *H04N 21/4788* (2013.01)

(58) Field of Classification Search
CPC ................................................ H04N 21/4788
See application file for complete search history.

(56) References Cited

U.S. PATENT DOCUMENTS

| | | | |
|---|---|---|---|
| 2009/0077064 A1* | 3/2009 | Daigle | H04N 21/4334 707/999.005 |
| 2011/0078717 A1* | 3/2011 | Drummond | H04N 21/4788 715/764 |
| 2017/0257445 A1 | 9/2017 | Baldwin et al. | |

FOREIGN PATENT DOCUMENTS

| | | |
|---|---|---|
| JP | 2013-506197 A | 2/2013 |
| JP | 2020-4410 A | 1/2020 |

(Continued)

OTHER PUBLICATIONS

International Search Report and Written Opinion (PCT/ISA/220, PCT/ISA/210, and PCT/ISA/237) dated May 25, 2023, issued by International Searching Authority for International Application No. PCT/KR2023/002863.

*Primary Examiner* — Michael H Hong
(74) *Attorney, Agent, or Firm* — Sughrue Mion, PLLC

(57) ABSTRACT

Provided is a method of generating a user-customized community list that includes obtaining, from a user device, a usage history of the user device, identifying a device group corresponding to the user device from a plurality of device groups, based on the usage history of the user device, obtaining a community list comprising at least one community corresponding to the device group, each community in the community list providing a communication service between members of the respective community, identifying a content information corresponding to a first content being used in the user device, generating the user-customized community list based on the content information and the community list, the user-customized community list comprising at least one first community corresponding to the first content, and at least one second community associated with the first content, and transmitting the user-customized community list to the user device.

20 Claims, 13 Drawing Sheets

(51) Int. Cl.
 *H04N 21/258* (2011.01)
 *H04N 21/2668* (2011.01)

(56) References Cited

FOREIGN PATENT DOCUMENTS

| KR | 10-2004-0078539 A | 9/2004 |
| KR | 10-2009-0072575 A | 7/2009 |
| KR | 10-2010-0031592 A | 3/2010 |
| KR | 10-0975419 B1 | 8/2010 |
| KR | 10-2011-0012828 A | 2/2011 |
| KR | 10-1161701 B1 | 7/2012 |
| KR | 10-1617429 B1 | 5/2016 |
| KR | 10-2016-0073667 A | 6/2016 |
| KR | 10-1626547 B1 | 6/2016 |
| KR | 10-1667603 B1 | 10/2016 |
| KR | 10-1711059 B1 | 2/2017 |
| KR | 10-1875230 B1 | 8/2018 |

\* cited by examiner

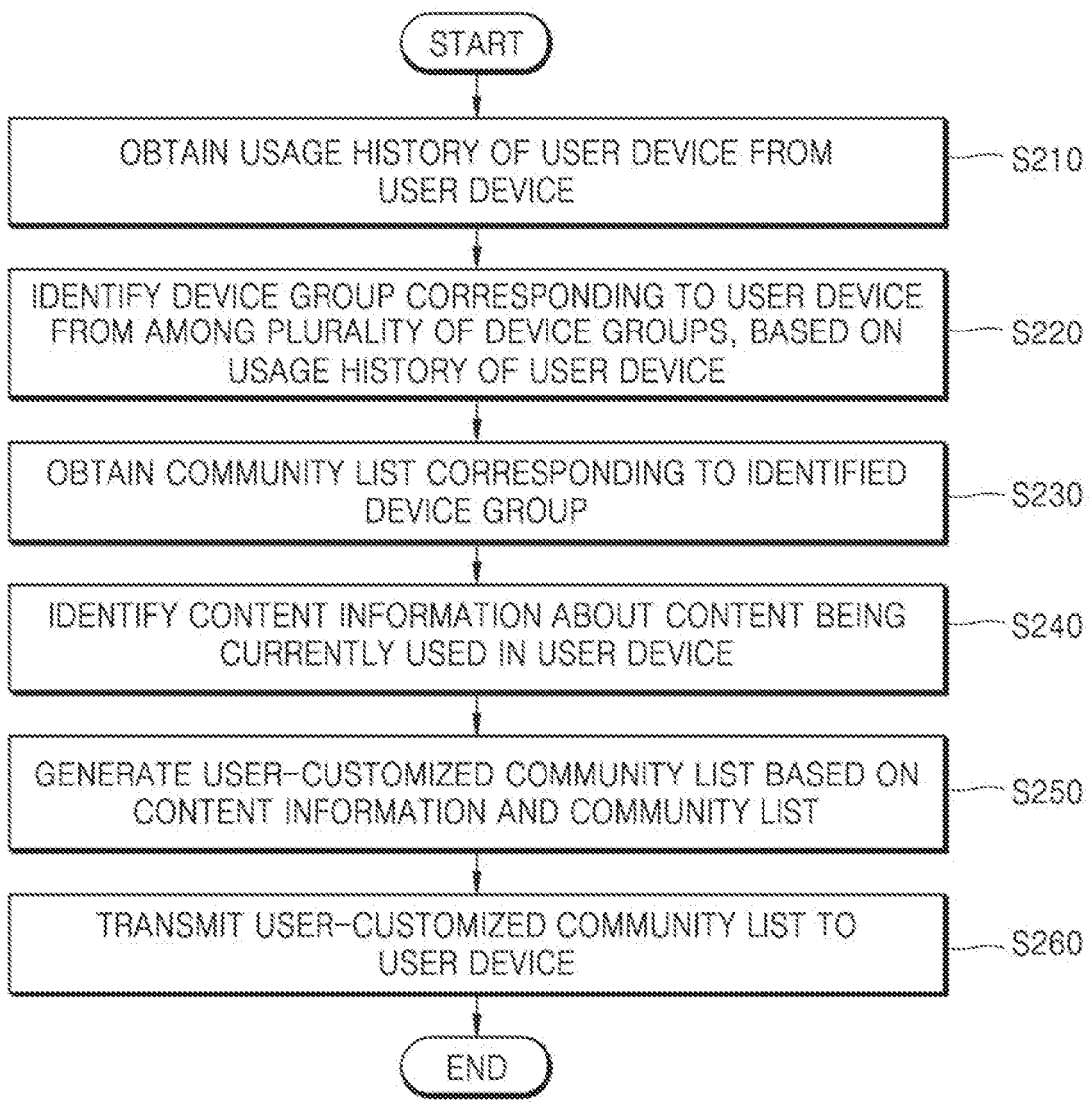

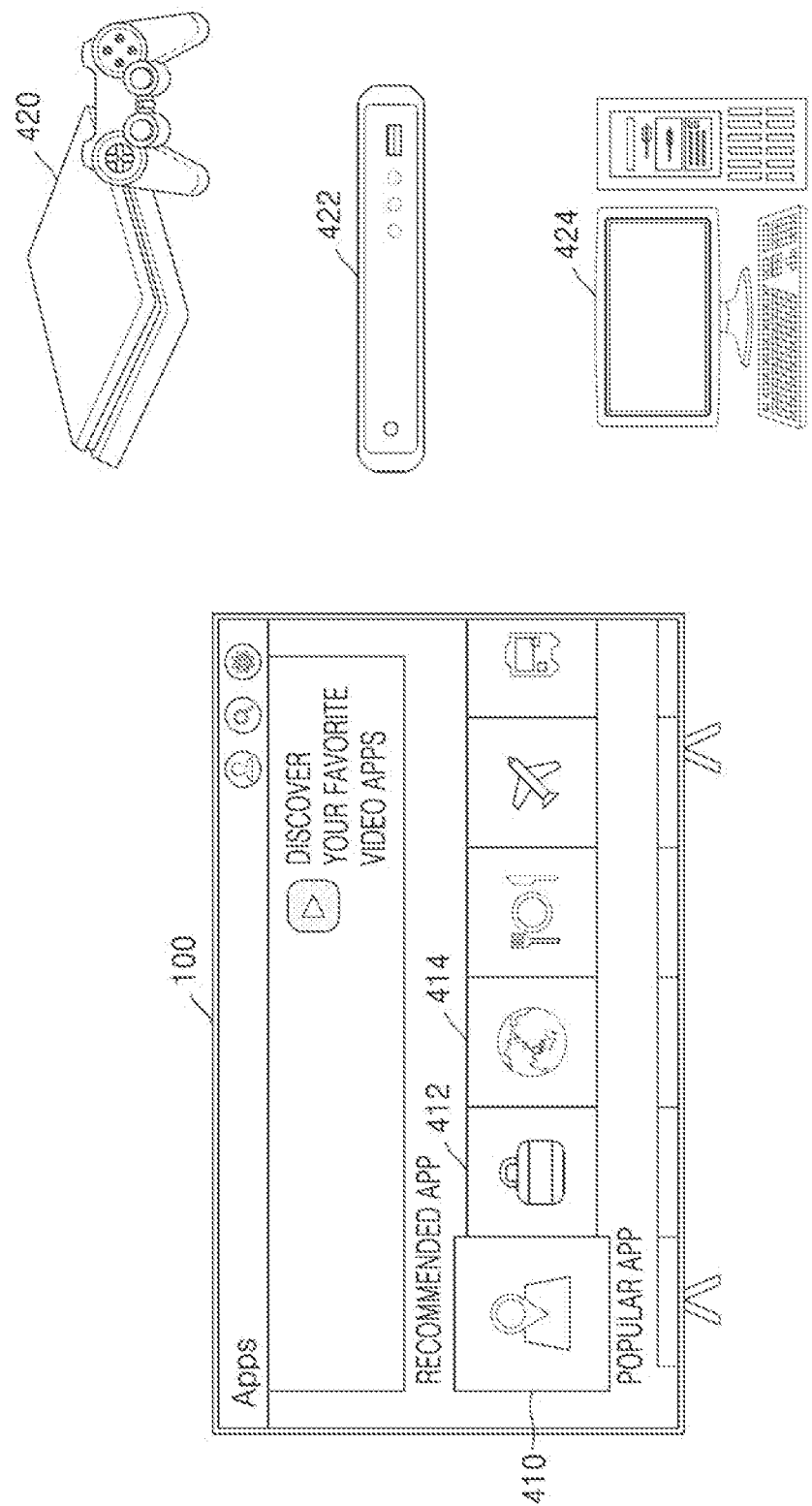

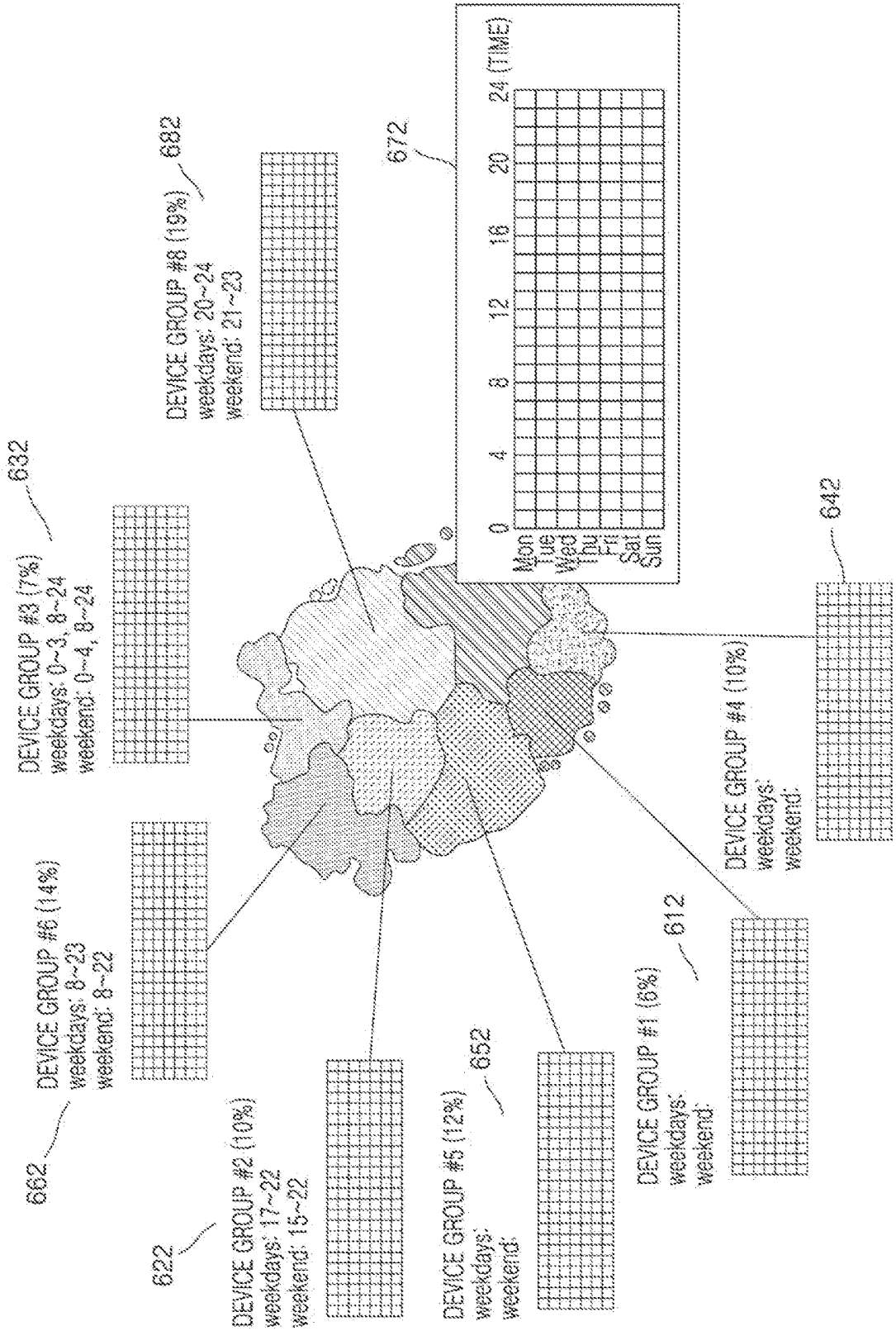

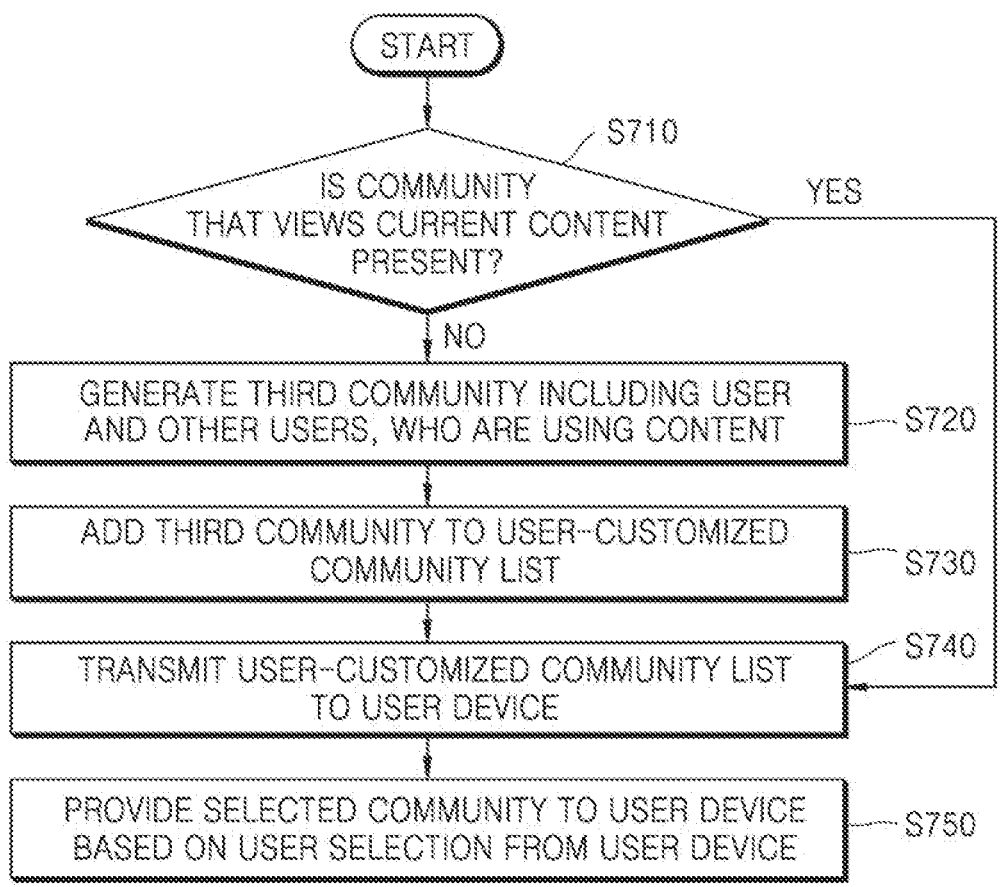

SERVER FOR GENERATING USER-CUSTOMIZED COMMUNITY LIST FOR USER DEVICE, AND OPERATING METHOD OF THE SERVER

CROSS-REFERENCE TO RELATED APPLICATION(S)

This application is a bypass continuation of PCT International Application No. PCT/KR2023/002863, which was filed on Mar. 2, 2023, and claims priority to Korean Patent Application No. 10-2022-0029467, filed on Mar. 8, 2022, in the Korean Intellectual Property Office, the disclosures of which are incorporated herein by reference in their entireties.

BACKGROUND

1. Field

The disclosure relates to a server for generating a user-customized community list, and an operating method of the server.

2. Description of Related Art

Recently, the number of content users with new content consumption patterns, who are different from existing viewers utilizing public channels, wired channels, or video on demand (VOD) services by using televisions (TVs) or the like, has been increasing. The number of viewers for personal Internet broadcasting by content creators is increasing, and public TV programs using such Internet broadcasting formats are also being produced.

When users of TVs or the like want to communicate with other users regarding content being currently used by the users, the users use communities on webpages associated with the content. In this case, the users need to conduct preliminary research on communities of webpages which allow the users to communicate with each other regarding the content being viewed by the users. Even users with the relevant knowledge need to go through the process of accessing the place of communication for each content consumed by the users. There is a need to provide users with community services that enable immediate communication through the convenient access thereto according to content being used on a device by a device user.

SUMMARY

One or more embodiments of the disclosure provide a server for generating a user-customized community list in order to provide a user of a specific device with a customized community list associated with current content of a specific device, based on information about a user device and information about devices of other users excluding the user device, and an operating method of the server.

Provided is server for generating a user-customized community list in order to provide a user of a device (the user device) with a customized community list associated with current content of the user device, based on information about the user device and information about devices of other users excluding the user device, and a method for operating the server.

According to an aspect of the disclosure, a method of generating a user-customized community list includes: obtaining, from a user device, a usage history of the user device; identifying a device group corresponding to the user device from a plurality of device groups, based on the usage history of the user device; obtaining a community list comprising at least one community corresponding to the device group, each community in the community list providing a communication service between members of the respective community; identifying a content information corresponding to a first content being used in the user device; generating the user-customized community list based on the content information and the community list, the user-customized community list comprising at least one first community corresponding to the first content, and at least one second community associated with the first content; and transmitting the user-customized community list to the user device.

Each of the at least one first community may provide a communication service with respect to the first content being used in the user device, and each of the at least one second community may provide a communication service with respect to another content similar to the first content being used in the user device.

The usage history of the user device may include a history associated with an application on the user device, and an external source used in connection with the user device.

The method may further include generating a third community comprising the user, and at least one other user using the first content as members; and adding the third community to the user-customized community list.

Adding the third community to the user-customized community list may include: adding the third community so that the third community is maintained after the members of the third community terminate use of the first content.

The method may further include identifying a second content being used in the user device; and updating the user-customized community list comprising the at least one first community and the at least one second community, based on the second content.

The method may further include identifying a selected community that is selected in the user device; identifying a content used by members of the selected community; and transmitting, to the user device, information about the content used by the members of the selected community.

The method may further include obtaining a plurality of usage histories of a plurality of devices, respectively; and determining the plurality of device groups based on clustering the plurality of devices into groups of devices having a similar usage history.

The determining of the plurality of device groups may include: applying a normalization and a dimensionality reduction algorithm to the plurality of usage histories.

The generating of the user-customized community list may include: generating the user-customized community list so that the at least one first community and the at least one second community are displayed differently in the user-customized community list, and a community information of each community in the user-customized community list is displayed together.

According to an aspect of the disclosure, a server for generating a user-customized community list includes: a communication interface configured to communicate with a user device; a memory storing one or more instructions; and a processor configured to execute the one or more instructions stored in the memory to: obtain, from the user device, a usage history of the user device, identify a device group corresponding to the user device from a plurality of device groups, based on the usage history of the user device, obtain a community list comprising at least one community corresponding to the device group, each community in the community list providing a communication service between members of the respective community, identify a content information corresponding to a first content being used in the user device, generate the user-customized community list based on the content information and the community list, the user-customized community list comprising at least one first community corresponding to the first content, and at least one second community associated with the first content, and transmit the user-customized community list to the user device.

Each of the at least one first community may provide a communication service with respect to the first content being used in the user device, and each of the at least one second community may provide a communication service with respect to another content similar to the first content being used in the user device.

The usage history of the user device may include a history associated with an application on the user device, and an external source used in connection with the user device.

The processor may be further configured to execute the one or more instructions to: generate a third community comprising the user, and at least one other user using the first content as members; and add the third community to the user-customized community list.

The processor may be further configured to execute the one or more instructions to: add the third community so that the third community may be maintained after the members of the third community terminate use of the first content.

The processor may be further configured to execute the one or more instructions to: identify a second content being using in the user device; and update the user-customized community list comprising the at least one first community and the at least one second community, based on the second content.

The processor may be further configured to execute the one or more instructions to: identify a selected community that is selected in the user device; identify a content used by members of the selected community; and transmit, to the user device, information about the content used by the members of the selected community.

The processor may be further configured to execute the one or more instructions to: obtain a plurality of usage histories of a plurality of devices, respectively; and determine the plurality of device groups based on clustering the plurality of devices into groups of devices having a similar usage history.

The processor may be further configured to execute the one or more instructions to: generate the user-customized community list so that the at least one first community and the at least one second community are displayed differently in the user-customized community list, and a community information of each community in the user-customized community list is displayed together.

According to an aspect of the disclosure, a non-transitory computer-readable recording medium stores computer readable program code or instructions which are executable by a processor to perform a method of generating a user-customized community list. The method includes: obtaining, from a user device, a usage history of the user device; identifying a device group corresponding to the user device from a plurality of device groups, based on the usage history of the user device; obtaining a community list comprising at least one community corresponding to the device group, each community in the community list providing a communication service between members of the respective community; identifying a content information corresponding to a first content being used in the user device; generating the user-customized community list based on the content information and the community list, the user-customized community list comprising at least one first community corresponding to the first content, and at least one second community associated with the first content; and transmitting the user-customized community list to the user device.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a flowchart illustrating a method, performed by a server, of providing a user-customized community list, according to an embodiment;

FIG. 4 is a diagram illustrating a usage history of a user device which is used by a server in order to generate a user-customized community list, according to an embodiment;

FIG. 6B is a diagram illustrating another example of a plurality of device groups, according to an embodiment;

FIG. 7 is a flowchart illustrating an operation, performed by a server, of generating a community for a user device, according to an embodiment;

DETAILED DESCRIPTION

Figure 1:
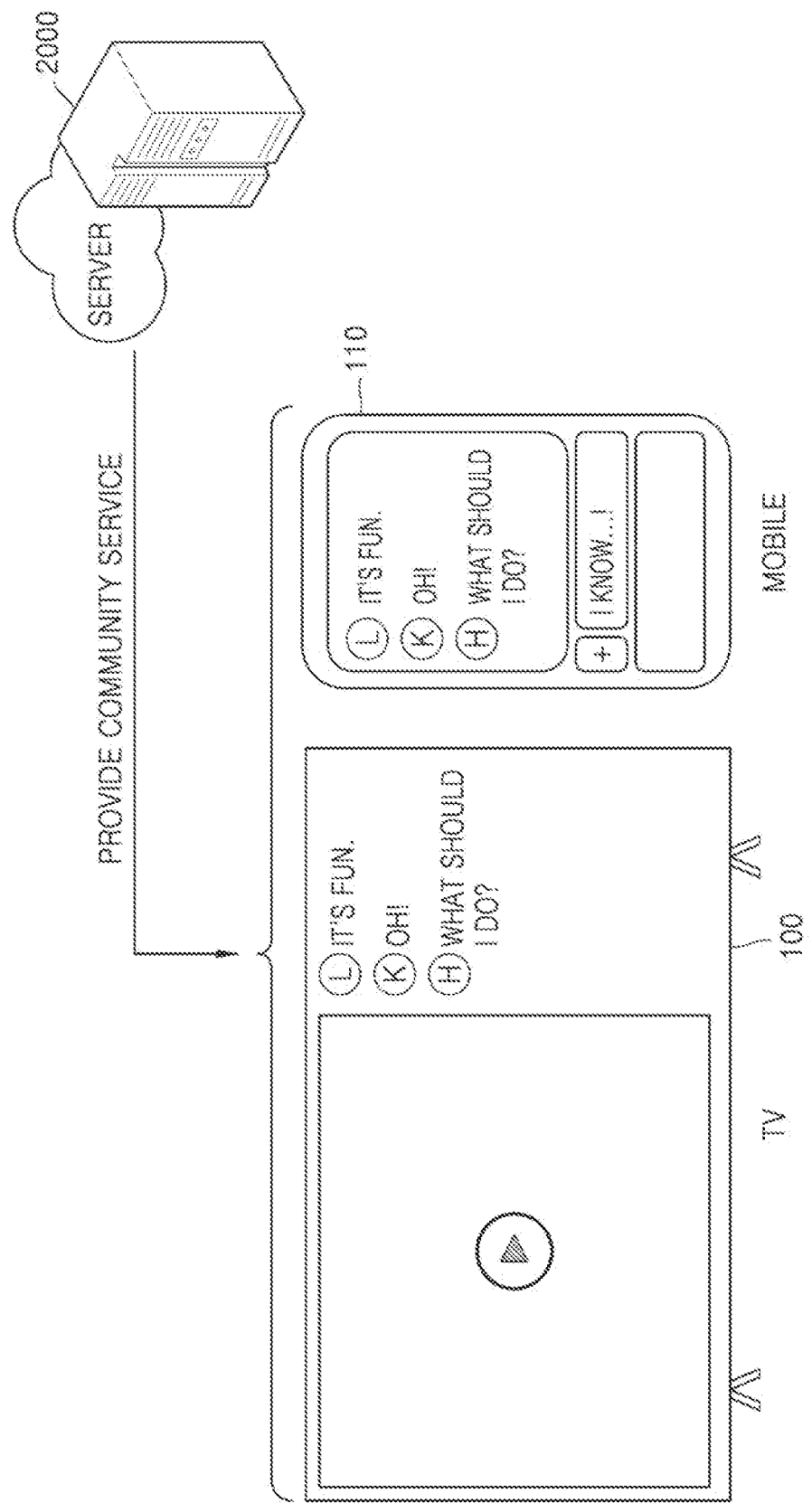
FIG. 1 is a schematic diagram illustrating a community service provided by a server, according to an embodiment.

In the disclosure, the expression "at least one of a, b or c" indicates "a," "b," "c," "a and b," "a and c," "b and c," or "all of a, b, and c."

The terms as used herein are briefly described, and the disclosure is described in detail.

As for the terms as used herein, common terms that are currently widely used are selected as much as possible while taking into account functions in embodiments of the disclosure. However, the terms may vary depending on the intention of those of ordinary skill in the art, precedents, the emergence of new technology, and the like. Also, in a specific case, there are also terms arbitrarily selected by the applicant. In this case, the meaning of the terms will be described in detail in the description of the embodiment of the disclosure. Therefore, the terms as used herein should be defined based on the meaning of the terms and the description throughout the disclosure rather than simply the names of the terms.

The singular forms "a," "an," and "the" as used herein are intended to include the plural forms as well unless the context clearly indicates otherwise. All terms including technical or scientific terms as used herein have the same meaning as commonly understood by those of ordinary skill in the art. It will be understood that although the terms "first," "second," etc. may be used to describe various elements, these elements should not be limited by these terms. These terms are only used to distinguish one element from another.

Throughout the specification, the expression "a portion includes a certain element" means that a portion further includes other elements rather than excludes other elements unless otherwise stated. Also, the terms such as " . . . er/or" and "module" described in the specification mean units that process at least one function or operation, and may be implemented as hardware, software, or a combination of hardware and software.

Hereinafter, the embodiment of the disclosure will be described in detail with reference to the accompanying drawings, so that those of ordinary skill in the art may easily carry out the disclosure. However, the disclosure may be implemented in various different forms and is not limited to the examples described herein. In order to clearly explain the disclosure, parts irrelevant to the description are omitted in the drawings, and similar reference numerals are assigned to similar parts throughout the specification.

FIG. 1 is a schematic diagram illustrating a community service provided by a server, according to an embodiment of the disclosure.

Referring to FIG. 1, a user device 100 may be a device that includes a display to output an image and/or video. For example, the user device 100 may include a smart television (TV), a smartphone, a tablet personal computer (PC), a laptop PC, a frame-type display, and the like, but the disclosure is not limited thereto, and the user device 100 may be implemented as various types and forms of electronic device including a display.

The user device 100 may be an electronic device configured to provide a community list including one or more communities that provide a communication service allowing a user to perform communication while viewing an image and/or video displayed on the display. The community is a service that allows a plurality of users to share their opinions on the same content. For example, the community may be an online/Internet platform that allows a plurality of users to perform communication (e.g., chatting, etc.) in real time with respect to the content being viewed while viewing the same content. In another example, the community may be an online/Internet platform that allows a plurality of users to perform communication (e.g., chatting, posting, comment, note, etc.) with respect to the same content without restrictions of time and space.

The server 2000 may identify a device group having an inclination similar to that of the user of the user device 100, based on the usage history of the user device 100, and may obtain a community list including communities opened for members of the identified device group. The server 2000 may select one or more communities to be provided based on the current situation of the user device 100 from the obtained community list and may provide the user device 100 with a user-customized community list including the selected one or more communities.

In an embodiment of the disclosure, the server 2000 may generate a user-customized community list that allows the user to use a communication function in the user device 100, based on the usage history of the user device 100 and content information about content displayed on the user device 100. The server 2000 may transmit the user-customized community list to the user device 100 so that the generated user-customized community list is displayed on the user device 100. As such, by providing the user-customized community list to the user device 100 based on the usage history of the user device 100 and the content information about the content displayed on the user device 100, the server 2000 may provide the customized community that allows the user to communicate with similar users in the current situation. Accordingly, an opportunity to select a more suitable community may be provided to the user.

The user-customized community list is for recommending communities of users having inclinations similar to the inclination of the user of the user device 100. The user-customized community list representing community recommendations for the user device 100 may be generated based on the usage history of the user device 100 and usage histories of devices possessed by users other than the user.

The user-customized community list generated by the server 2000 may include, for example, at least one of communities corresponding to the current content of the user device 100, communities associated with the current content of the user device 100, newly generated communities for the content used in the user device 100, currently opened communities, or communities the user has joined. In an embodiment of the disclosure, the communities corresponding to the current content of the user device 100 may include one or more communities for communication with respect to the content being currently used in the user device 100, and the communities associated with the current content of the user device 100 may include one or more communities for communication with respect to other content similar to the content being currently used in the user device 100.

In an embodiment of the disclosure, the community service provided by the server 2000 may also be provided identically or similarly to a second device 110 (e.g., a smartphone) of the user other than the user device 100. For example, when the user device 100 is a TV, a chatting service may be used on the TV through a community, and when the second device 110 is a smartphone, a same/similar chatting service may be used through a community converted into a user experience/user interface (UX/UI) suitable for the smartphone. However, in the following embodiment of the disclosure, the user device 100 will be described as a single device for convenience of explanation, but the user device 100 is not limited to a single device, as described above.

In an embodiment of the disclosure, the server 2000 may generate a new community including the user of the user device 100 and other users, who are using specific content. When a new community is generated, the server 2000 may maintain and manage the community so that members of the community continue to communicate with each other even after the use of content by the members of the community is terminated.

A detailed description of specific operations, performed by the server 2000, of generating the user-customized community list and displaying the user-customized community list on the user device 100 will be given in more detail below with reference to the accompanying drawings.

FIG. 2 is a flowchart illustrating a method, performed by a server, of providing a user-customized community list, according to an embodiment of the disclosure.

Referring to FIG. 2, in operation S210, the server 2000 obtains the usage history of the user device 100 from the user device 100.

In an embodiment of the disclosure, the usage history of the user device 100 includes a history associated with applications executed on the device and a history associated with an external source used in connection with the device. The user device 100 may generate the usage history by collecting a history of applications executed on the user device 100 for a certain period and external sources used in connection with the user device 100. Examples of the applications executed on the user device 100 may include over-the-top (OTT) media service applications, video applications, and game applications. Also, the external sources used in connection with the user device 100 refer to devices that are connected to the user device 100 and provide content to the user device 100. That is, when the external source is connected to the user device 100, the external source provides input content/media to the user device 100. Examples of the external sources may include game consoles, set-top boxes, desktop PCs, and laptop PCs. The server 2000 may obtain, from the user device 100, the usage history of the user device 100 collected for a certain period.

In operation S220, the server 2000 identifies a device group corresponding to the user device 100 from a plurality of device groups, based on the usage history of the user device 100. The device groups refer to groups of devices having similar usage histories based on the usage histories of devices other than the user device 100. That is, the device groups each include devices having similar usage histories.

The device groups may include, for example, "device group 1" including devices that mainly use video content through a video reproduction application, "device group 2" including devices that mainly use video content through a set-top box, which is an external source, "device group 3" including devices that mainly use game content through a game console, which is an external source, and the like.

In operation S230, the server 2000 obtains a community list corresponding to the identified device group.

In an embodiment of the disclosure, the community refers to an online/Internet platform that provides a communication function (e.g., note, posting, comment, real-time chatting, etc.) so that users share various opinions on specific content and/or specific topics. In the following embodiment of the disclosure, a real-time chatting function among various communication functions will be described as an example, but the functions of the community provided in the disclosure are not limited thereto.

The server 2000 obtains a community list corresponding to the device group with respect to the device group corresponding to the user device 100. In this case, the communities in the community list may be communities including users in the device group as community members.

In operation S240, the server 2000 identifies content information about content being currently used in the user device 100. The content information may include, for example, content identification information, a content name, content episode information, a content genre, a content producer, channel information about a channel on which content is broadcast, a content broadcast time, and the like, but the disclosure is limited thereto, and the content information may include a variety of information related to features of the content. For example, when the content being used in the user device 100 is TV program "A," the content information may include content-related information, such as program identification information, a program name, a genre, a broadcast time, and cast members.

In operation S250, the server 2000 generates a user-customized community list based on the content information and the community list.

In an embodiment of the disclosure, the server 2000 may select, from the community list obtained in operation S230, communities to be provided to the user, based on current content information about the current content being used in the user device 100. In an embodiment of the disclosure, the user-customized community list may be configured in various ways.

For example, the user-customized community list may include communities corresponding to the current content being used in the user device 100. The community corresponding to the current content being used in the user device 100 may be a community that provides a communication function for the current content being used in the user device 100, and may be a community whose members are users who want to talk about common interests in the current content being used in the user device 100.

In another example, the user-customized community list may include communities associated with the current content being used in the user device 100. The communities associated with the current content being used in the user device 100 may be a community that provides a communication function for another content similar to the current content being used in the user device 100, and may be a community whose members are users who want to talk about common interests in another content. In another example, the user-customized community list may include communities the user of the user device 100 has joined. However, the communities included in the user-customized community list generated by the server 2000 are not limited to the above examples, and may be determined in various ways based on current content information about the current content being used in the user device 100 and the community list determined based on device groups corresponding to the user device 100.

In operation S260, the server 2000 transmits the user-customized community list to the user device 100.

The server 2000 may transmit user-customized community lists to the user device 100 and provide a service of a community selected through the user device 100 according to a user input of selecting one of the user-customized community lists.

In an embodiment of the disclosure, the user input may be an input of selecting a community corresponding to the current content being used in the user device 100. In this case, the user device 100 may receive, from the server 2000, the community corresponding to the current content without changing the content in the user device 100. Accordingly, the user of the user device 100 may use both the current content and the community corresponding to the current content.

In an embodiment of the disclosure, the user input may be an input of selecting a community corresponding to other content excluding the current content being used in the user device 100. For example, the community corresponding to the other content may be a community the user has previously joined, or may be a community corresponding to content other than the current content being used in the user device 100. In this case, the user device 100 may change the content to display the other content corresponding to the selected community and may receive, from the server 2000, the community corresponding to the other content. Accordingly, the user of the user device 100 may use both the other content and the community corresponding to the other content.

Figure 3A:
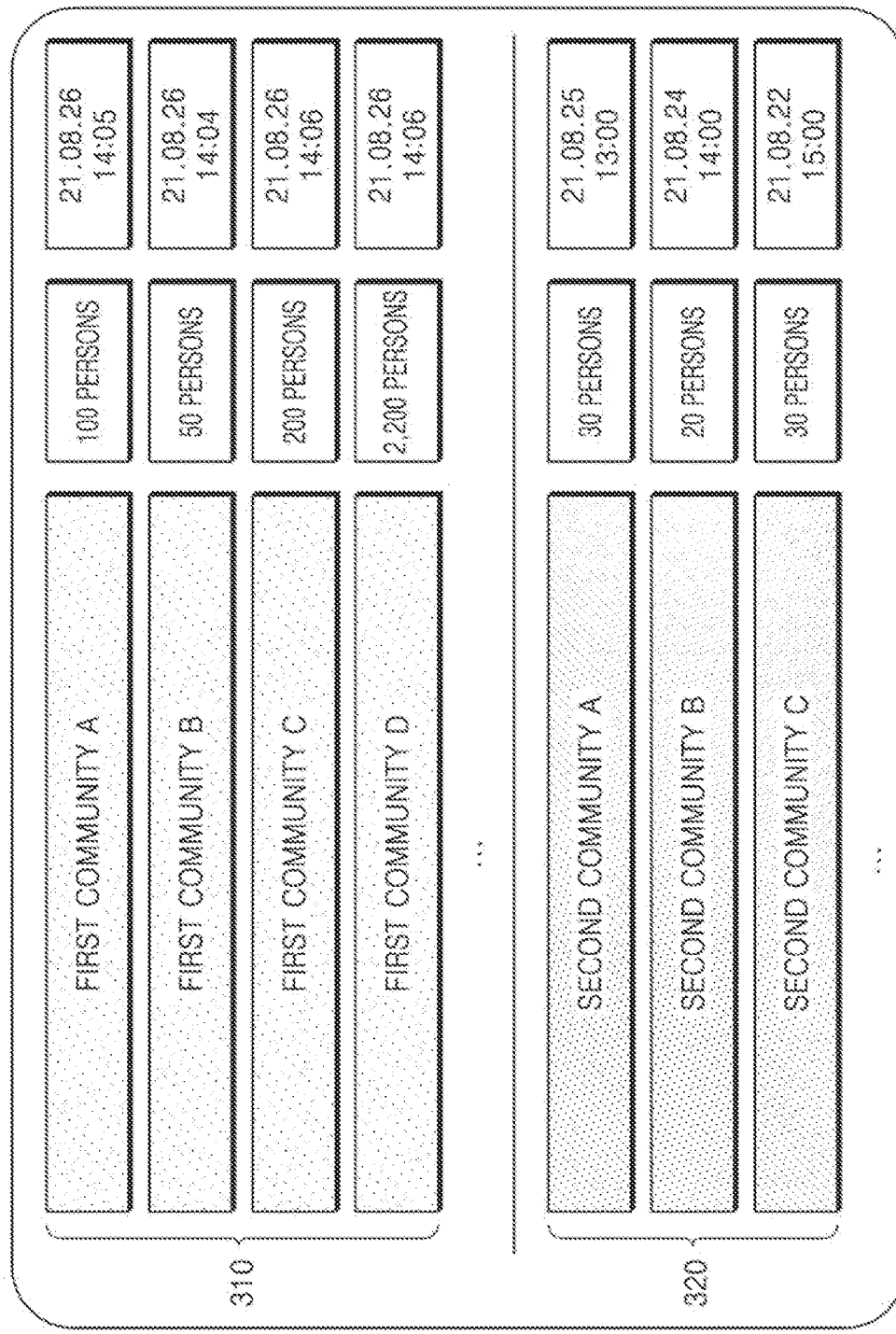
FIG. 3A is a diagram illustrating a user-customized community list generated by a server, according to an embodiment.

FIG. 3A is a diagram illustrating a user-customized community list generated by a server, according to an embodiment of the disclosure.

Referring to FIG. 3A, the server 2000 may generate a user-customized community list 300 based on current content information of the user device 100 and a community list corresponding to a device group. In this case, the device group refers to a group including devices having usage histories similar to the usage history of the user device 100, based on the usage history of the user device 100.

In an embodiment of the disclosure, the community list corresponding to the device group includes a plurality of different communities whose members are users included in the device group. The server 2000 may generate the user-customized community list 300 by selecting some communities from the communities of the community list corresponding to the device group, based on the current content information of the user device 100. The user-customized community list 300 may also display community information for each community included in the community list. The community information may include, for example, a community name, a reason for recommending the community, the number of participants in the community, a last communication time, etc., but the disclosure is not limited thereto. Specifically, the user-customized community list 300 may include community information, such as "Community A," which is a community name, "users having similar inclinations to me who is using the current content," which is a reason for displaying the community, "N persons," which is the number of participants in the community, and date and time of last communication.

In an embodiment of the disclosure, the user-customized community list 300 may include first communities 310 corresponding to the current content of the user device 100. For example, when the current content being used in the user device 100 is "X," first community A, first community B, first community C, first community D, etc., which are the first communities 310, may be communities corresponding to content "X." For example, first community A may be a community including other users using current content "X." In another example, first community D may be a community including other users who have subscribed to content "X" regardless of whether current content "X" is being used.

In an embodiment of the disclosure, the user-customized community list 300 may include second communities 320 corresponding to other content associated with the current content of the user device 100. For example, when the current content being used in the user device 100 is "X," second community A, second community B, second community C, etc. may be communities corresponding to other content associated with content "X." For example, second community A may be a community corresponding to content "Y," which is similar to content "X." In another example, second community B may be another community corresponding to content "Y," which is similar to content "X." In another example, second community C may be a community corresponding to content "Z," which is similar to content "X."

In an embodiment of the disclosure, the server 2000 may generate a new community and add the generated new community to the user-customized community list 300. In an embodiment of the disclosure, the server 2000 may generate a third community including the user of the user device 100 and other users using the current content, and may add the third community to the user-customized community list 300.

In an embodiment of the disclosure, the server 2000 may receive an input of selecting any one community in the user-customized community list 300 from the user device 100. The server 2000 may transmit community-related information to the user device 100 so that the community selected by the user device 100 is provided.

In an embodiment of the disclosure, the server 2000 may transmit, to the user device 100, content information corresponding to the selected community, based on the input of selecting any one community in the user-customized community list 300 from the user device 100. In this case, the user device 100 may change the content of the user device 100 based on the content information received from the server 2000. For example, as the community corresponding to the current content of the user device 100 is selected, when the content information received from the server 2000 is the same as the current content being used in the user device 100, the user device 100 may provide the community service selected by the user without changing content. Alternatively, as the community associated with content different from the current content of the user device 100 is selected, when the content information received from the server 2000 is different from the current content being used in the user device 100, the user device 100 may provide the community service selected by the user while displaying content corresponding to the content information received from the server 2000.

In the description of FIG. 3A, the ordinal numbers "first," "second," "third," etc. in the first community, the second community, and the third community are used for the purpose of distinguishing communities with different features from each other, and are not intended to limit the order of the communities.

Figure 3B:
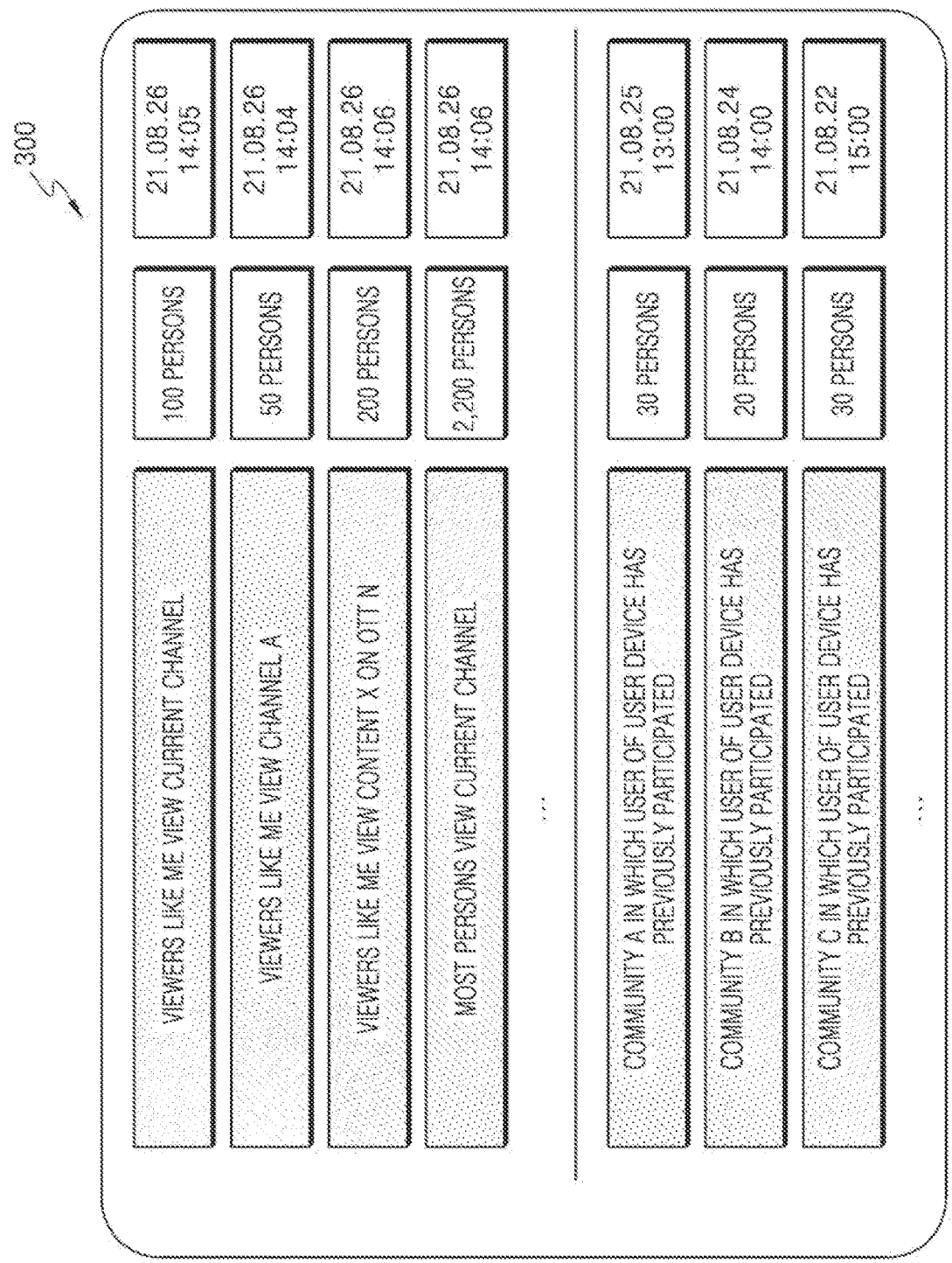
FIG. 3B is a diagram illustrating another example of a user-customized community list generated by a server, according to an embodiment.

FIG. 3B is a diagram illustrating another example of the user-customized community list generated by the server 2000, according to an embodiment of the disclosure.

Referring to FIG. 3B, the user-customized community list 300 may include fourth communities that are currently opened communities. For example, the user-customized community list 300 may include currently opened communities, such as "viewers like me view current channel," "viewers like me view channel A," "viewers like me view content X on OTT N," and "most persons view current channel," etc. In this case, the currently opened communities may be determined based on information about current content being reproduced in the user device 100 from communities in the community list determined from device groups corresponding to the user device 100. When the server 2000 generates the user-customized community list 300, the server 2000 may allow the fourth communities, which are the currently opened communities, to be included in the user-customized community list 300.

In an embodiment of the disclosure, the user-customized community list 300 may include fifth communities that are communities in which the user of the user device 100 has previously participated. For example, the user-customized community list 300 may include communities in which the user of the user device 100 has participated in the past, such as "community A in which the user of the user device has previously participated," "community B in which the user of the user device has previously participated," "community C in which the user of the user device has previously participated," etc. When the server 2000 generates the user-customized community list 300, the server 2000 may allow fifth communities that are communities in which the user of the user device 100 has previously participated, to be included in the user-customized community list 300.

In the description of FIG. 3B, the ordinal numbers "fourth," "fifth," etc. in the fourth community and the fifth community are used for the purpose of distinguishing communities with different features from each other, and are not intended to limit the order of the communities.

FIG. 4 is a diagram illustrating a usage history of a user device used by a server in order to generate a user-customized community list, according to an embodiment of the disclosure.

Referring to FIG. 4, the usage history obtained from the user device 100 is described as an example. The usage history of the user device 100 includes a usage history associated with applications executed on the device and a usage history associated with an external source used in connection with the device.

In an embodiment of the disclosure, a plurality of applications may be installed on the user device 100. For example, application A 410, application B 412, application C 414, etc. may be installed on the user device 100. The user device 100 may store various histories that are obtainable as the applications are executed on the user device 100. The usage history associated with the applications may include, for example, an application name, the number of executions of the application, time and date of execution of the application, an application execution rate, a type of application (e.g., OTT media service application, video application, game application, etc.), content information about content used in the application, a usage time of content used in the application, etc., but the disclosure is not limited thereto.

In an embodiment of the disclosure, various types of external sources may be connected to the user device 100. For example, external sources, such as a game console 420, a set-top box 422, and a desktop PC 424, may be connected to the user device 100 to provide content. However, the types of external sources connected to the user device 100 are only an example, and the disclosure is not limited thereto. The user device 100 may store various histories that are obtainable as the external source is used in connection with the user device 100. The usage history associated with the external sources may include the time and date when the external source is connected, the number of connections, an application executed when the external source is connected, content information about content used when the external source is connected, a usage time of content used when the external source is connected, etc., but the disclosure is not limited thereto.

In an embodiment of the disclosure, a device group that the server 2000 selects for the user device 100 may be generated by grouping devices having usage histories similar to the usage history of the user device 100, based on the usage histories of other devices. An operation, performed by the server 2000, of determining a device group will be described below.

Figure 5:
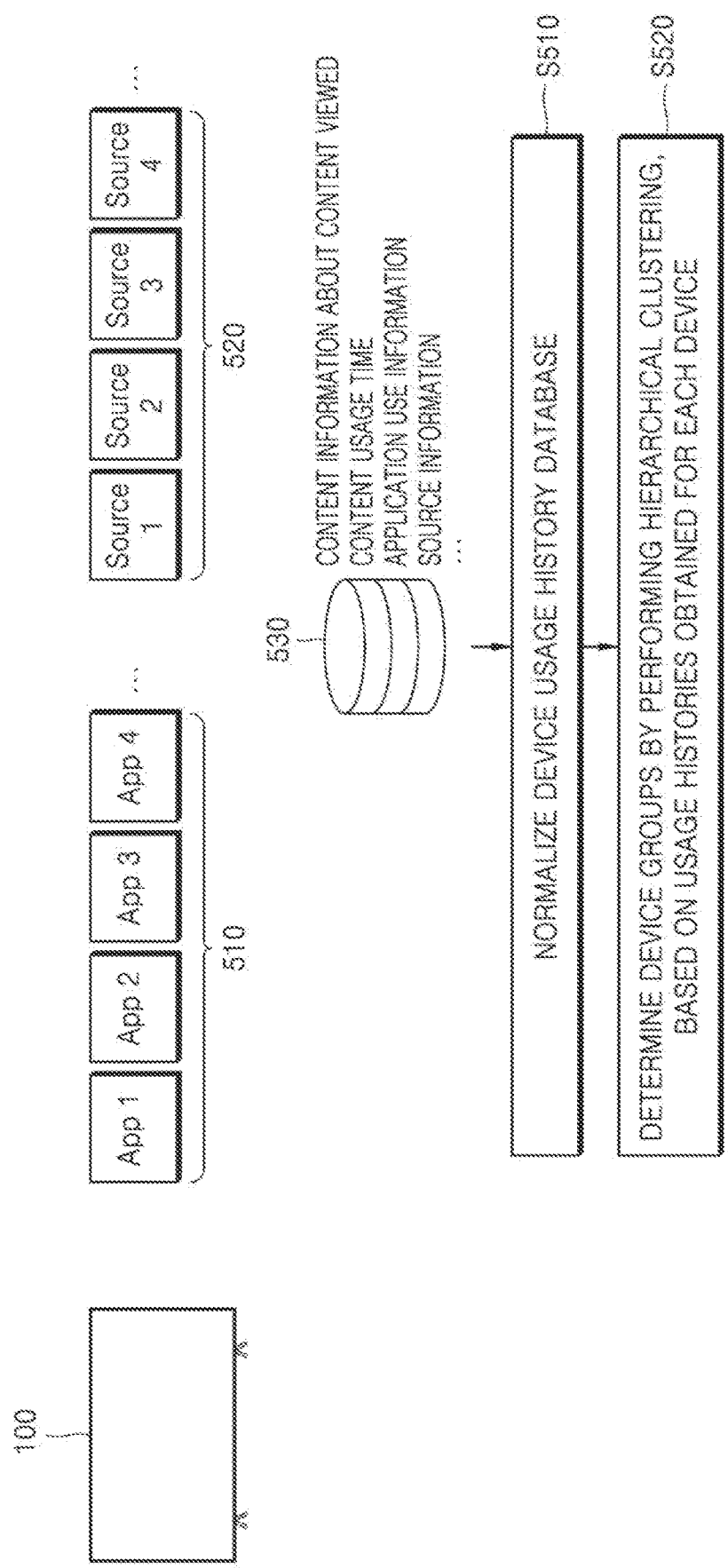
FIG. 5 is a schematic diagram illustrating an operation, performed by a server, of determining a device group, according to an embodiment.

FIG. 5 is a schematic diagram illustrating an operation, performed by a server, of determining a device group, according to an embodiment of the disclosure.

Referring to FIG. 5, the server 2000 may collect a usage history associated with applications 510 installed on the user device 100 and a usage history associated with external sources 520 used in connection with the user device 100.

The server 2000 may generate a device usage history database 530 by collecting usage histories of devices of other users excluding the user device 100. The device usage history database 530 includes the usage histories of the user device 100 and the other devices. For example, the device usage history database 530 may include content information about content viewed on each device, a content usage time, application use information, connected source information, etc.

The server 2000 may group the devices by using the device usage history database 530.

In operation S510, the server 2000 normalizes data of the device usage history database 530. In an embodiment of the disclosure, the user device 100 and the other devices use a plurality of different applications and/or sources from each other. Accordingly, the usage histories of the devices are different from each other with respect to each device and are high-dimensional data having a plurality of variables of applications and sources. The server 2000 may select data for grouping the devices from the usage histories of the devices. For example, when the server 2000 determines a device group according to content used in the device, the server 2000 may select content information about content viewed on the device and a content viewing time as features. The content information may include content identification information, a content name, content episode information, a content genre, a content producer, content broadcast channel information, a content broadcast time, etc. The server 2000 may normalize the selected features according to the feature usage time or the number of uses of the feature for each device. In this case, the server 2000 may use the selected feature as it is, or may use a plurality of features by separately grouping the features.

In an embodiment of the disclosure, the server 2000 may use a dimensionality reduction algorithm to reduce features, which are selected from the usage history of the device and then normalized, to two dimensions. In this case, the server 2000 may use an algorithm, such as t-stochastic neighbor embedding (t-SNE). However, the dimensionality reduction algorithm used by the server 2000 is only an example and the disclosure is not limited thereto. The server 2000 may calculate an Euclidean distance between the other devices after applying the dimensionality reduction algorithm to the usage histories of the other devices.

In operation S520, the server 2000 determines device groups by performing hierarchical clustering, based on the usage histories obtained for each device. The server 2000 may cluster devices by grouping adjacent devices (devices having short Euclidean distances), based on Euclidean distances between devices. The server 2000 may determine device groups by determining users of devices included in clusters having a high degree of similarity as users having similar content preferences and grouping the devices included in the clusters.

In an embodiment of the disclosure, the server 2000 may select features from a usage history associated with an application and a usage history associated with a source. Through operations S510 and S520, the server 2000 may determine device groups by determining users of devices included in clusters having a high degree of similarity as users having similar application (e.g., Y video app, N OTT app, A TV app, etc.) preference or similar source (e.g., set-top box, OTT box, game console, etc.) preference and grouping the devices included in the clusters.

In an embodiment of the disclosure, the server 2000 may select a device usage time as a feature. Through operations S510 and S520, the server 2000 may determine device groups by determining users of devices included in clusters having a high degree of similarity as users having similar device viewing/usage environments and grouping the devices included in the clusters.

In an embodiment of the disclosure, the server 2000 may select cast member information, a program name, a region, etc. as a feature from a content electronic program guide (EPG) and may determine device groups according to the above-described embodiment of the disclosure.

In an embodiment of the disclosure, the server 2000 may select a degree of a user's participation in a community, preference, etc. as a feature from a community usage history using a community service provided by the server 2000 and may determine device groups according to the above-described embodiment of the disclosure.

Figure 6A:
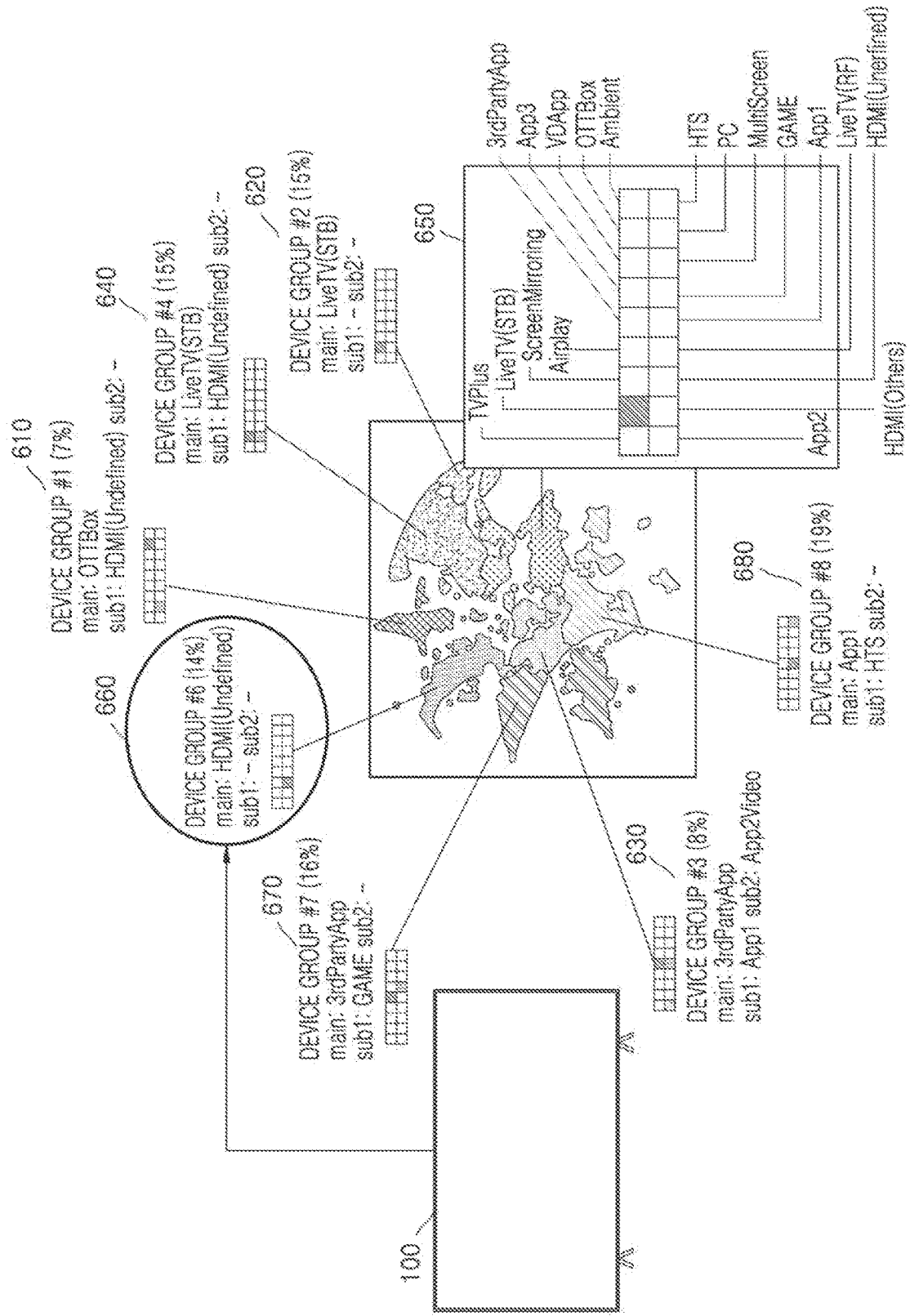
FIG. 6A is a diagram illustrating an example of a plurality of device groups, according to an embodiment.

FIG. 6A is a diagram illustrating an example of a plurality of device groups, according to an embodiment of the disclosure.

The server 2000 may generate device groups by grouping devices having similar usage histories, based on usage histories of other devices excluding the user device 100. FIG. 6A illustrates an example in which a plurality of device groups are determined based on a history associated with applications and sources from device usage histories.

In an embodiment of the disclosure, the server 2000 may group devices based on a history associated with applications and sources in order to classify users into users having similar application preferences or similar source preferences.

In an embodiment of the disclosure, a device group that the server 2000 generates by analyzing usage histories of other devices may have a main usage history and a sub-usage history. In this case, one or more sub-usage histories may be present.

For example, for devices included in "device group 1" 610, a main usage history may be a history in which an OTT box that was an external source among various applications and/or external sources was connected and used, and a sub-usage history may be a history in which a high-definition multimedia interface (HDMI) source was connected and used. In this case, HDMI (Undefined) means that a device through an external connection of an HDMI source is not specifically defined. Specifically, it may be a case where an external source such as a set-top box is connected through an HDMI, but specific device information is not identified. Also, for devices included in "device group 2" 620, a main usage history may be the use of App1 (video streaming app), and a sub-usage history may be a history in which a home theater system (HTS) was connected and used. Similarly, a main usage history of "device group 3" 630 may be the use of third party app, "sub-usage history 1" may be App1, and "sub-usage history 2" may be App2. A main usage history of "device group 4" 640 may be Live TV (set-top box), and a sub-usage history may be HDMI (Undefined).

The server 2000 may generate "device group 5" 650, "device group 6" 660, "device group 7" 670, "device group 8" 680, etc., which have different main usage histories and sub-usage histories.

The server 2000 may analyze the usage history of the user device 100. The server 2000 may identify the device group corresponding to the user device 100 from the device groups, based on a result of analyzing the usage history of the user device 100. For example, as a result of the server 2000 analyzing the usage history of the user device 100, a main usage history of the user device 100 may be a history in which an HDMI, which was an external source, was connected and used. In this case, because a main usage history of "device group 6" 660 from the device groups is the HDMI, the server 2000 may select "device group 6" 660 as the device group corresponding to the user device 100.

In this case, the server 2000 may obtain a community list including users of devices included in "device group 6" 660. The server 2000 may generate the user-customized community list by selecting at least a part of communities from the community list including the users of the devices included in "device group 6" 660, based on information about current content being used in the user device 100.

FIG. 6B is a diagram illustrating another example of a plurality of device groups, according to an embodiment of the disclosure.

The server 2000 may generate device groups by grouping devices having similar usage histories, based on usage histories of other devices excluding the user device 100. FIG. 6B illustrates an example in which a plurality of device groups are determined based on a usage history for each day of week and time zone among usage histories of devices.

In an embodiment of the disclosure, the server 2000 may group devices based on a usage history for each day of week and time in order to classify users into users having similar device viewing/usage environments. For example, the server 2000 may generate "device group 1" 612 through "device group 8" 682, which are classified as having different usage environments from each other.

In an embodiment of the disclosure, a device group that the server 2000 generates by analyzing usage histories of other devices may have a weekday usage history and a weekend usage history. For example, "device group 2" 622 may include devices that are mainly used between 17:00 and 22:00 on weekdays and between 15:00 and 22:00 on weekends. Also, "device group 6" 662 may include devices that are mainly used between 8:00 and 23:00 on weekdays and between 8:00 and 22:00 on weekends.

The server 2000 may analyze the usage history of the user device 100 and identify the device group corresponding to the user device 100 from the device groups, based on a result of the analyzing. For example, as a result of the server 2000 analyzing the usage history of the user device 100, the user device 100 may be a device that is mainly used between 20:00 and 24:00 on weekdays and between 21:00 and 23:00 on weekends. In this case, because "device group 8" 682 from the device groups corresponds to the main usage time zone of the user device 100, the server 2000 may select "device group 8" 682. In this case, the server 2000 may obtain a community list including users of devices included in "device group 8" 682. The server 2000 may generate the user-customized community list by selecting at least a part of communities from the community list including users of devices included in "device group 8" 682, based on information about current content being used in the user device 100.

The method, performed by the server 2000, of analyzing the usage history of the user device 100 and selecting the device group corresponding to the user device 100 based on the usage history, is not limited to the above examples. For example, when the user device 100 is a device that mainly uses a video application, the server 2000 may select a device group in which other devices that mainly use the video application are grouped. In another example, when the user device 100 is a device that is mainly used in connection with a set-top box, which is an external source, the server 2000 may select a device group in which other devices that mainly use the set-top box are grouped. In another example, when the user device 100 is a device of a user who prefers content of a specific type/genre, the server 2000 may select a device group in which other devices of other users who prefer the content of the specific type/genre are grouped.

FIG. 7 is a flowchart illustrating an operation, performed by a server, of generating a community for a user device, according to an embodiment of the disclosure.

In an embodiment of the disclosure, operations of FIG. 7 may be performed after operation S240 of FIG. 2.

In operation S710, the server 2000 identifies whether a community that views current content is present. The current content refers to content being currently used in the user device 100. The server 2000 may obtain a community list of device groups corresponding to the user device 100 and may identify whether the community that views the current content is present among communities included in the community list. When the community that views the current content of the user device 100 is present, the server 2000 may perform operation S740. When the community that views the current content of the user device 100 is not present, the server 2000 may perform operation S720.

In operation S720, the server 2000 generates a third community including the user and other users, who are using the content. The third community may provide a real-time chatting function or the like so that members of the community communicate with each other with respect to the current content. When a new device that starts viewing the current content is identified from the devices in the device group corresponding to the user device 100 while the current content is being reproduced, the server 2000 may join the new device to the third community.

In operation S730, the server 2000 may add the third community to a user-customized community list. In this case, user-customized communities may include first communities corresponding to the current content of the user device 100, second communities associated with the current content, and the newly generated third community.

In operation S740, the server 2000 transmits the user-customized community list to the user device 100. The user device 100 may display the user-customized community list received from the server 2000.

In operation S750, the server 2000 provides the selected community to the user device 100 based on the user selection from the user device. The user of the user device 100 may communicate with other users through the selected community.

Figure 8:
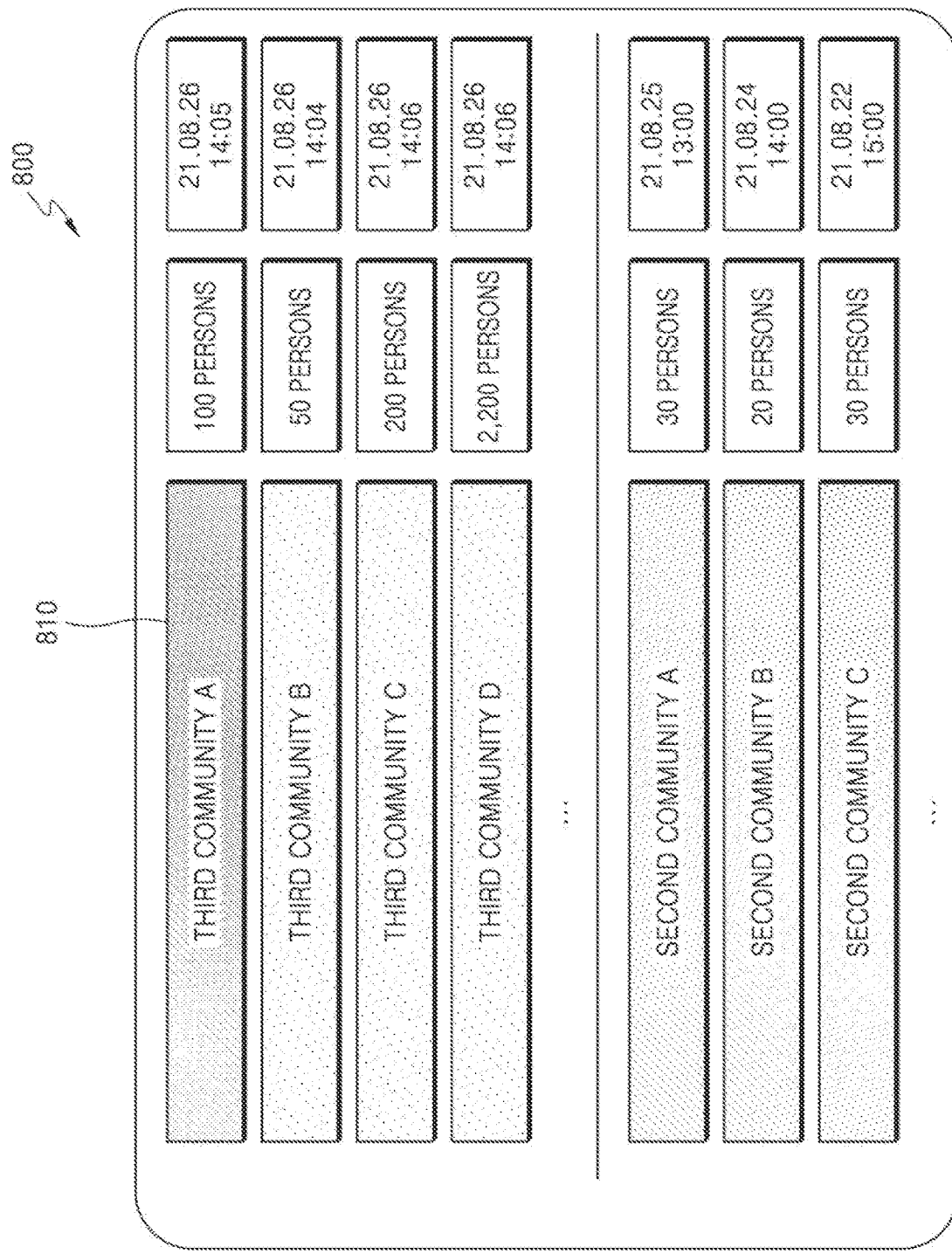
FIG. 8 is a diagram illustrating a user-customized community list generated by a server, according to an embodiment.

FIG. 8 is a diagram illustrating a user-customized community list generated by a server, according to an embodiment of the disclosure.

Referring to FIG. 8, when the server 2000 generates a user-customized community list 800, user-customized communities may include a third community 810 that is newly generated in addition to first communities corresponding to the current content of the user device 100 and second communities associated with the current content.

In an embodiment of the disclosure, the server 2000 may generate the user-customized community list 800 to be displayed at the top of the user-customized community list 800, so that the user of the user device 100 easily selects the third community 810.

In an embodiment of the disclosure, when the server 2000 generates the user-customized community list 800, the server 2000 may display the first communities, the second communities, and the third communities visually differently in the user-customized community list 800. For example, because the communities have different features from each other, the server 2000 may display the first community, the second community, and the third community differently in the user-customized community list 800.

In an embodiment of the disclosure, the server 2000 may add the third community to the community list so that the community for the content is maintained even when the third community is newly generated for the content (e.g., TV program, movie, etc.), and then, the use of the content by members of the third community is terminated. The third community added to the community list may be managed as the community maintained by the server 2000. The third community added to the community list may be displayed as a community candidate in the user-customized community list for other users.

Figure 9:
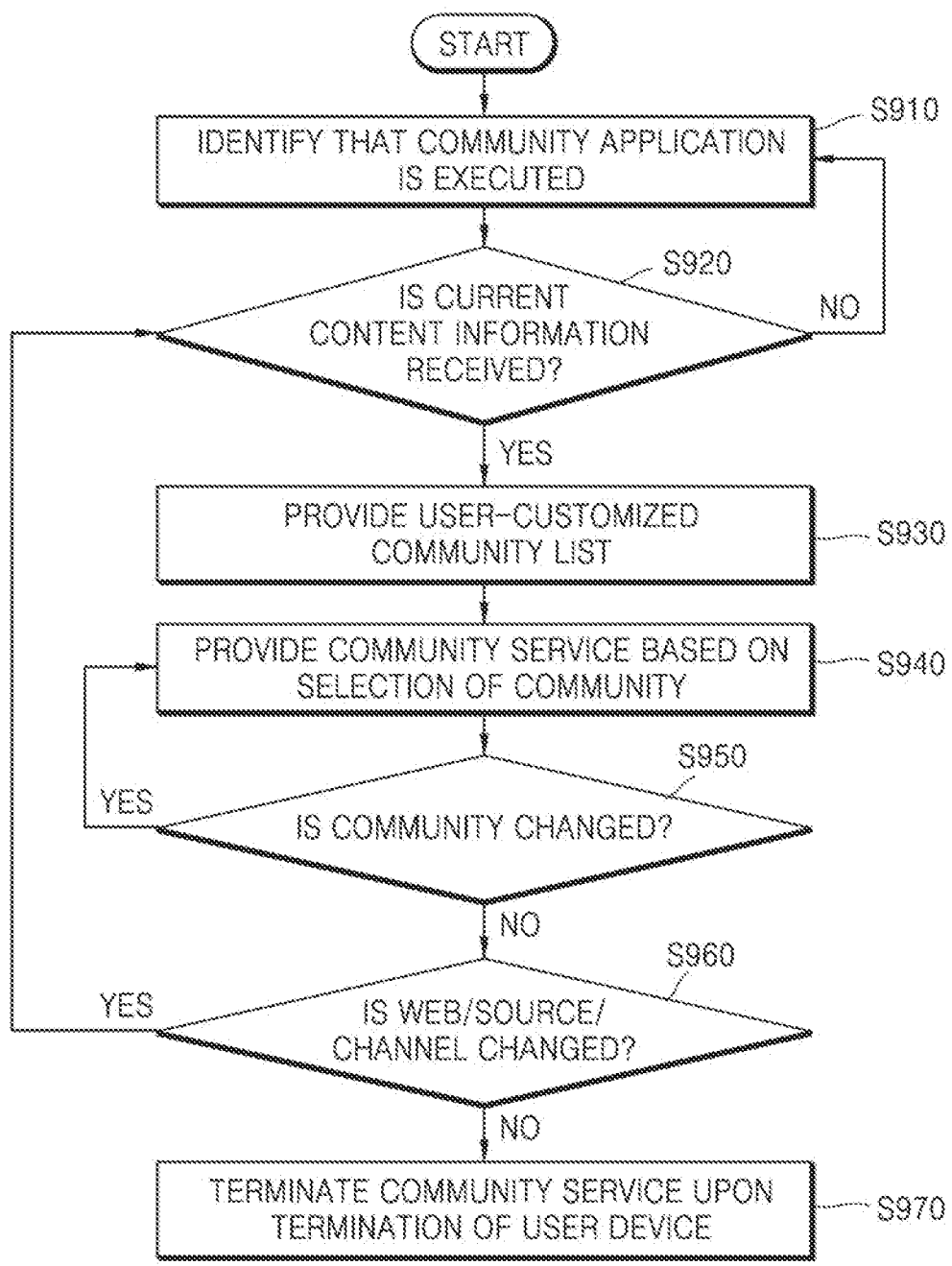
FIG. 9 is a flowchart illustrating an overall operation, performed by a server, of providing a community service, according to an embodiment.

FIG. 9 is a flowchart illustrating an overall operation, performed by a server, of providing a community service, according to an embodiment of the disclosure.

Referring to FIG. 9, in operation S910, the server 2000 identifies that a community application is executed. The server 2000 may receive, from the user device 100, information indicating that the community application has been executed. In an embodiment of the disclosure, as content is used in the user device 100, the community application may be automatically executed in the user device 100, and the server 2000 may receive, from the user device 100, information indicating that the community application has been executed.

In operation S920, the server 2000 identifies whether current content information is received from the user device 100. For example, the user device 100 may recognize the displayed content by using content metadata or a content recognition algorithm, and may provide content information about the recognized content to the server 2000. When the current content of the user device 100 is not identified, the server 2000 may wait until content information is received, in order to provide a user-customized community list corresponding to the content of the user device 100.

In operation S930, the server 2000 provides the user-customized community list to the user device 100. The server 2000 may obtain a device group and a community list corresponding to the user device 100 based on the current content information of the user device 100, and may generate the user-customized community by selecting at least a part of communities from the obtained community list.

In operation S940, the server 2000 may provide a community service based on the selection of the community from the user device 100. The server 2000 may provide the user device 100 with data used to execute the service of the community selected by the user device 100, so that the user device uses both the current content and the community service.

In operation S950, the server 2000 monitors whether a community change request is received from the user device 100. The server 2000 may identify that another community is selected by the user device 100. In an embodiment of the disclosure, when another community (e.g., first community) corresponding to the current content is selected, the server 2000 may provide a service of the selected other community while maintaining the current content. In an embodiment of the disclosure, when another community (e.g., second community) corresponding to content other than the current content is selected, the server 2000 may identify content used by other users constituting the other community. The server 2000 may transmit content information about content being used by other users to the user device 100, so that the user device 100 may provide content corresponding to the selected community. The user device 100 may change the community and content to be displayed on the user device 100, based on the content information and the community information received from the server 2000.

In operation S960, the server 2000 monitors whether an application, a source, a channel, etc. is changed from the user device 100. As the application, the source, the channel, etc. is changed in the user device 100, the server 2000 may receive content information from the user device 100 and may identify that the content of the user device 100 is changed. The server 2000 may perform operation S920 when the content of the user device 100 is changed. The server 2000 may update the user-customized community list based on changed content information. In this case, the updated user-customized community list may include communities corresponding to or associated with the changed content.

In operation S970, the server 2000 terminates the community service upon termination of the user device 100.

Figure 10:
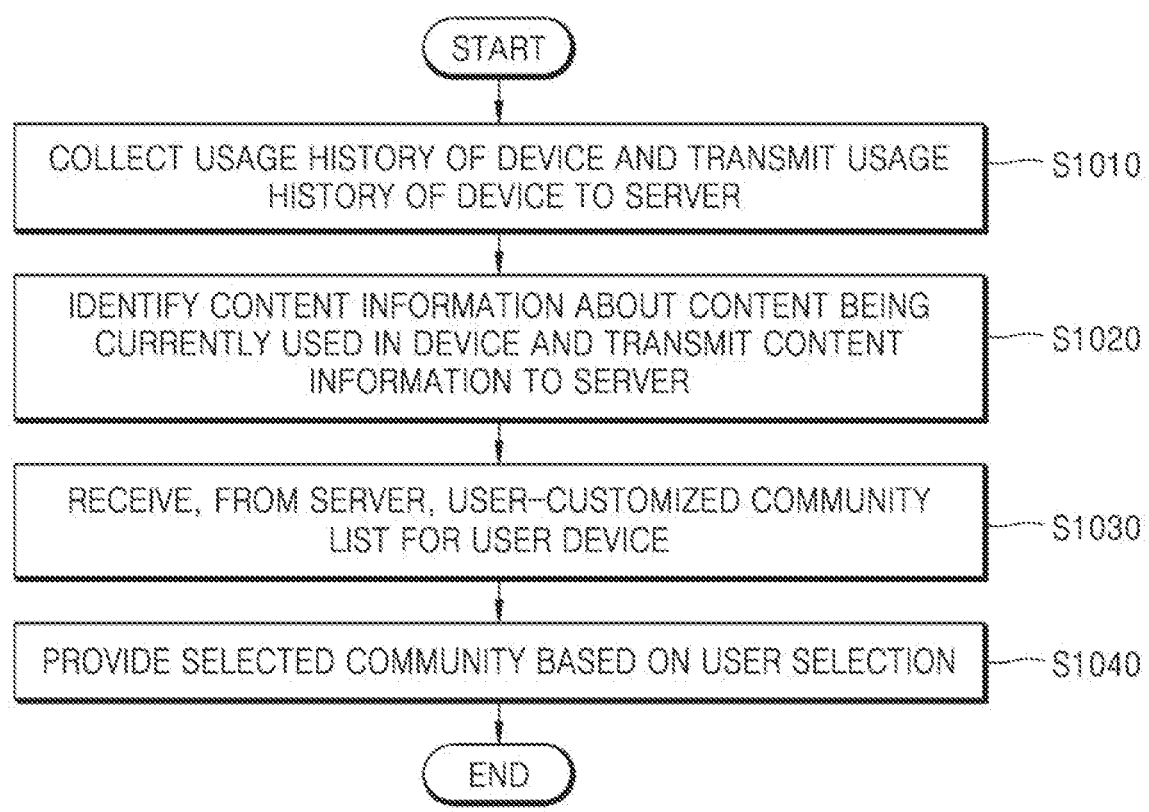
FIG. 10 is a flowchart illustrating an operation of a user device receiving a user-customized community list, according to an embodiment.

FIG. 10 is a flowchart illustrating an operation of a user device receiving a user-customized community list, according to an embodiment of the disclosure.

Referring to FIG. 10, in operation S1010, the user device 100 collects a usage history of a device and transmits the usage history of the device to the server 2000. The usage history of the device may include a history associated with applications executed on the device and a history associated with an external source used in connection with the device. The server 2000 may obtain and manage a usage history of the user device 100 and usage histories of other devices.

In operation S1020, the user device 100 identifies content information about content being currently used in the user device 100 and transmits current content information to the server. The server 2000 identifies a device group corresponding to the user device 100 according to the above-described embodiment of the disclosure. The server 2000 may obtain a community list corresponding to the identified device group and may generate a user-customized community list to be provided to the user device 100, based on the current content information of the user device 100 received from the user device 100 from communities included in the community list.

In operation S1030, the user device 100 receives, from the server 2000, a user-customized community list for the user device 100. The user device 100 may display the user-customized community list.

In operation S1040, the user device 100 provides the selected community based on the user selection. That is, the user device 100 receives a user input of selecting one community from the displayed user-customized community list and requests the server 2000 for information about the community selected according to the user input. The user device 100 may provide the community selected by the user by receiving, from the server 2000, information for executing the community service corresponding to the selected community.

In an embodiment of the disclosure, when the user inputs a community change, the user device 100 may change content to correspond to the changed community. In an embodiment of the disclosure, when the user inputs a content change, the user device 100 may display the updated user-customized community list so that a community corresponding to the changed content is selected.

Figure 11:
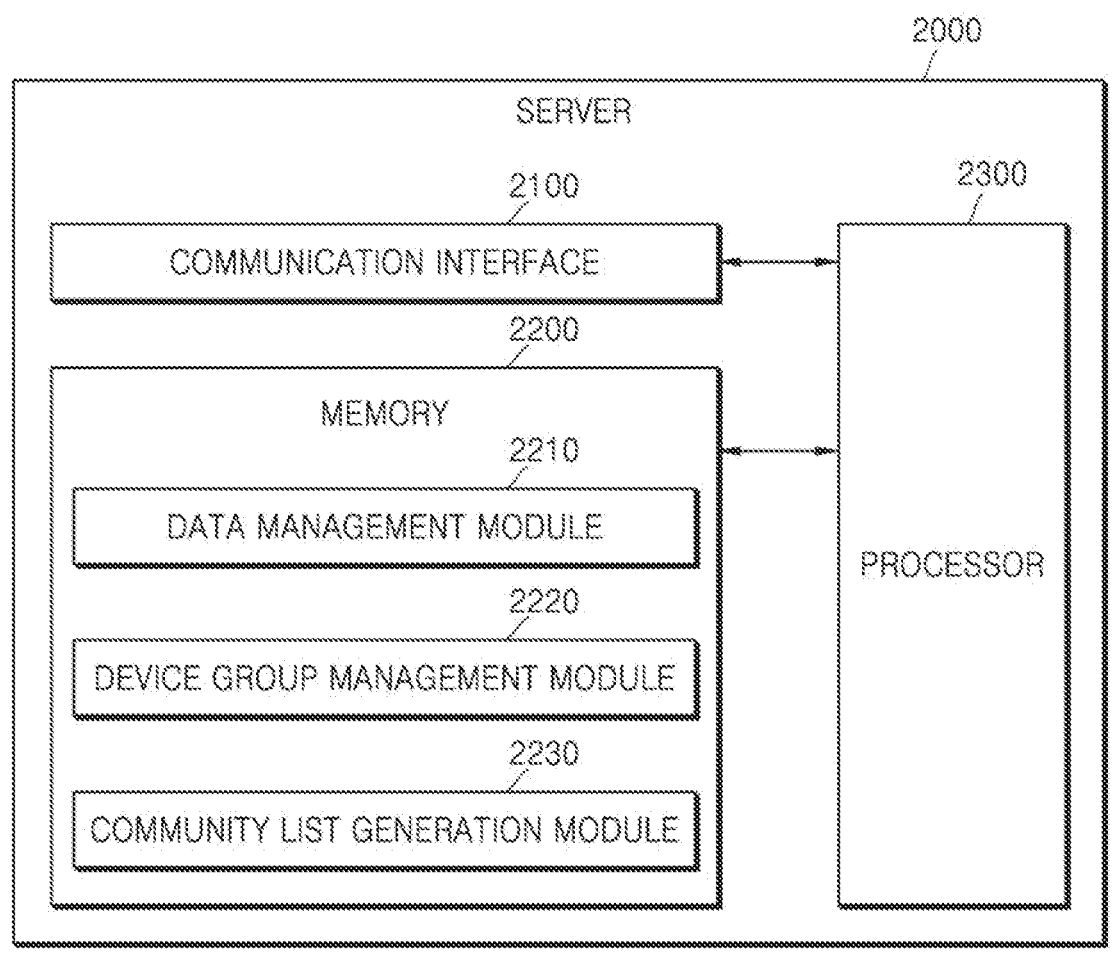
FIG. 11 is a block diagram illustrating a configuration of a server, according to an embodiment.

FIG. 11 is a block diagram illustrating a configuration of a server, according to an embodiment of the disclosure.

Referring to FIG. 11, a server 2000 may include a communication interface 2100, a memory 2200, and a processor 2300.

The communication interface 2100 may perform data communication with other electronic devices under the control of the processor 2300.

The communication interface 2100 may perform data communication between the server 2000 and other devices by using at least one of data communication schemes including, for example, wired local area network (LAN), wireless LAN, Wireless Fidelity (Wi-Fi), Bluetooth, ZigBee, Wi-Fi Direct (WFD), Infrared Data Association (IrDA), Bluetooth Low Energy (BLE), Near Field Communication (NFC), Wireless Broadband Internet (Wibro), World Interoperability for Microwave Access (WiMAX), Shared Wireless Access Protocol (SWAP), Wireless Gigabit Alliance (WiGig), and radio frequency (RF) communication.

The communication interface 2100 may transmit and receive, to and from an external device, data for generating a user-customized community list. For example, the communication interface 2100 may receive a usage history of the user device 100 from the user device 100 or may receive usage histories from user devices other than the user device 100. The communication interface 2100 may transmit, to the user device 100, the user-customized community list generated by the server 2000.

The memory 2200 may store instructions, a data structure, and program code, which are readable by the processor 2300. In an embodiment of the disclosure, operations performed by the processor 2300 may be implemented by executing instructions or codes of a program stored in the memory 2200.

The memory 2200 may include flash memory-type memory, hard disk-type memory, multimedia card micro-type memory, or card-type memory (e.g., secure digital (SD) or extreme digital (XD) memory), may include a non-volatile memory including at least one of read-only memory (ROM), electrically erasable programmable read-only memory (EEPROM), or programmable read-only memory (PROM), and may include a volatile memory, such as random access memory (RAM) or static random access memory (SRAM).

The memory 2200 may store one or more instructions or programs that operate to generate a user-customized community list. For example, a data management module 2210, a device group management module 2220, and a community list generation module 2230 may be stored in the memory 2200.

The processor 2300 may control overall operations of the server 2000. For example, the processor 2300 may execute one or more instructions of a program stored in the memory 2200 to control overall operations of the server 2000 to generate the user-customized community list.

The processor 2300 may include at least one of a central processing unit, a microprocessor, a graphic processing unit), application specific integrated circuits (ASICs), digital signal processors (DSPs), digital signal processing devices (DSPDs), programmable logic devices (PLDs), field programmable gate arrays (FPGAs), an application processor, and a neural processing unit, or an artificial intelligence (AI)-only processor designed with a hardware structure specialized for processing of an AI model, but the disclosure is not limited thereto.

In an embodiment of the disclosure, the processor 2300 may execute the data management module 2210 to manage the usage history of the device.

The processor 2300 may collect the usage history of the user device 100. The processor 2300 may also collect usage histories of devices other than the user device 100. The usage history of the device may include a history associated with applications executed on the device and a history associated with an external source used in connection with the device. The device may generate a usage history by collecting histories of applications executed on the device for a certain period and other devices used in connection with the device. Examples of the applications executed on the device may include OTT media service applications, video applications, and game applications. Also, the external sources used in connection with the device refer to different types of devices used in connection with the device. The external sources are connected to the device to provide input content/media to the device. The external sources distinguish from other devices of other users, which are devices of the same type as the user device. Examples of the external sources may include game consoles, set-top boxes, desktop PCs, and laptop PCs.

In an embodiment of the disclosure, the processor 2300 may execute the device group management module 2220 to generate a plurality of device groups. The processor 2300 may reduce the dimension of the usage histories of a plurality of devices to two dimensions or three dimensions by using a dimensionality reduction algorithm. The processor 2300 may calculate an Euclidean distance between the devices after applying the dimensionality reduction algorithm to the usage histories of the devices. The processor 2300 may cluster a plurality of devices by using a hierarchical clustering algorithm, and may generate a plurality of device groups in which devices having similar features are grouped based on a result of the clustering. Because this has already been described in the foregoing embodiment of the disclosure, the same description is omitted.

In an embodiment of the disclosure, the processor 2300 may execute the community list generation module 2230 to generate a user-customized community list. The processor 2300 may manage a community list including users of each of the device groups as members for each of the device groups classified based on the usage history. The processor 2300 may generate a user-customized community list by selecting at least one of communities in the community list corresponding to the device group, based on content information of the user device 100. The user-customized community list generated by the server 2000 may include, for example, at least one of communities corresponding to the current content of the user device 100, communities associated with the current content of the user device 100, newly generated communities for the content used in the user device 100, currently opened communities, or communities the user has joined.

In an embodiment of the disclosure, the server 2000 may transmit, to the user device 100, the user-customized community list generated for the user device 100. The user device 100 may display the user-customized community list received from the server 2000 and may provide, based on an input of selecting one of the displayed communities, the service of the selected community to the user.

The block diagram of the server 2000 illustrated in FIG. 11 is a block diagram for an embodiment of the disclosure. The components of the block diagram may be integrated, added, or omitted according to the specifications of actually implemented devices. That is, when necessary, two or more components may be integrated into one component, or one component may be divided into two or more components. Additionally, the function performed by each block is for describing the embodiment of the disclosure and the specific operation or device thereof does not limit the scope of the disclosure.

An operating method of the server 2000, according to an embodiment of the disclosure, may be implemented in the form of program instructions that are executable through a variety of computer means and may be recorded on a computer-readable recording medium. The computer-readable recording medium may include program instructions, data files, data structures, etc. alone or in combination. The program instructions recorded on the computer-readable recording medium may be those specially designed and configured for the disclosure or those known to and usable by those skilled in computer software. Examples of the computer-readable recording medium may include hardware devices specially configured to store and execute program instructions, such as magnetic media (e.g., hard disk, floppy disk, and magnetic tape), optical media (e.g., compact disc read-only memory (CD-ROM) and digital versatile disc (DVD)), magneto-optical media (e.g., floptical disk), ROM, RAM, and flash memory. Examples of the program instructions may include not only machine language codes generated by a compiler, but also high-level language codes that are executable using an interpreter by a computer. The computer-readable recording medium may be provided in the form of a non-transitory recording medium. The non-transitory recording medium is a tangible device and only means not including a signal (e.g., electromagnetic wave). This term does not distinguish between a case where data is semi-permanently stored in a recording medium and a case where data is temporarily stored in a recording medium. For example, the non-transitory recording medium may include a buffer in which data is temporarily stored.

Also, the operating method of the server 2000, according to the embodiment of the disclosure, may be provided by being included in a computer program product. The computer program products may be traded between a seller and a buyer as commodities.

The computer program product may include a software (S/W) program and a computer-readable storage medium storing the S/W program. For example, the computer program product may include a product (e.g., a downloadable application) in the form of an S/W program that is electronically distributed through an electronic device manufacturer or an electronic market. For electronic distribution, at least a part of the S/W program may be stored in a storage medium, or may be temporarily generated. In this case, the storage medium may be a storage medium of a server of a manufacturer, a server of an electronic market, or a relay server temporarily storing an SW program.

In a system including a server and a client device, the computer program product may include a storage medium of the server or a storage medium of the client device. Alternatively, when a third device (e.g., a smartphone) communicatively connected to the server or the client device is present, the computer program product may include a storage medium of the third device. Alternatively, the computer program product may include an S/W program itself that is transmitted from the server to the client device or the third device or is transmitted from the third device to the client device.

In this case, one of the server, the client device, and the third device may execute the computer program product to perform the methods according to the embodiment of the disclosure. Alternatively, two or more of the server, the client device, and the third device may execute the computer program product to perform the methods according to the embodiment of the disclosure in a distributed manner.

For example, the server (e.g., a cloud server or an AI server) may execute the computer program product stored in the server to control the client device communicatively connected to the server to perform the methods according to the embodiment of the disclosure.

Although the embodiment of the disclosure has been described in detail, the scope of the disclosure is not limited thereto, and various modifications and improvements made using the basic concept of the disclosure defined in the appended claims and their equivalents by those of ordinary skill in the art also fall within the scope of the disclosure.

What is claimed is:

1. A method of generating a user-customized community list, comprising:
   obtaining, from a user device, a usage history of the user device;
   identifying a device group corresponding to the user device from a plurality of device groups, based on the usage history of the user device;
   obtaining a community list comprising at least one community corresponding to the device group, each community in the community list providing a communication service between members of the respective community;
   identifying content information corresponding to a first content being used in the user device;
   generating the user-customized community list based on the content information and the community list, the user-customized community list comprising at least one first community corresponding to the first content, and at least one second community associated with the first content; and
   transmitting the user-customized community list to the user device.

2. The method of claim 1, wherein each of the at least one first community provides a communication service with respect to the first content being used in the user device, and
   each of the at least one second community provides a communication service with respect to another content similar to the first content being used in the user device.

3. The method of claim 1, wherein the usage history of the user device comprises a history associated with an application on the user device, and an external source used in connection with the user device.

4. The method of claim 1, further comprising:
   generating a third community comprising the user, and at least one other user using the first content as members; and
   adding the third community to the user-customized community list.

5. The method of claim 1, further comprising:
   identifying a second content being used in the user device; and
   updating the user-customized community list comprising the at least one first community and the at least one second community, based on the second content.

6. The method of claim 1, further comprising:
   identifying a selected community that is selected in the user device;
   identifying a content used by members of the selected community; and
   transmitting, to the user device, information about the content used by the members of the selected community.

7. The method of claim 1, further comprising:
   obtaining a plurality of usage histories of a plurality of devices, respectively; and
   determining the plurality of device groups based on clustering the plurality of devices into groups of devices having a similar usage history.

8. The method of claim 1, wherein the generating of the user-customized community list comprises generating the user-customized community list so that the at least one first community and the at least one second community are displayed differently in the user-customized community list, and community information of each community in the user-customized community list is displayed together.

9. The method of claim 4, wherein the adding the third community to the user-customized community list comprises adding the third community so that the third community is maintained after the members of the third community terminate use of the first content.

10. The method of claim 7, wherein the determining of the plurality of device groups comprises applying a normalization and a dimensionality reduction algorithm to the plurality of usage histories.

11. A server for generating a user-customized community list, comprising:
    a communication interface configured to communicate with a user device;
    a memory storing one or more instructions; and
    a processor configured to execute the one or more instructions to:
       obtain, from the user device, a usage history of the user device,
       identify a device group corresponding to the user device from a plurality of device groups, based on the usage history of the user device,
       obtain a community list comprising at least one community corresponding to the device group, each community in the community list providing a communication service between members of the respective community,
       identify content information corresponding to a first content being used in the user device,
       generate the user-customized community list based on the content information and the community list, the user-customized community list comprising at least one first community corresponding to the first content, and at least one second community associated with the first content, and
       transmit the user-customized community list to the user device.

12. The server of claim 11, wherein each of the at least one first community provides a communication service with respect to the first content being used in the user device, and
    each of the at least one second community provides a communication service with respect to another content similar to the first content being used in the user device.

13. The server of claim 11, wherein the usage history of the user device comprises a history associated with an application on the user device, and an external source used in connection with the user device.

14. The server of claim 11, wherein the processor is further configured to execute the one or more instructions to:
    generate a third community comprising the user, and at least one other user using the first content as members; and
    add the third community to the user-customized community list.

15. The server of claim 11, wherein the processor is further configured to execute the one or more instructions to:
    identify a second content being using in the user device; and
    update the user-customized community list comprising the at least one first community and the at least one second community, based on the second content.

16. The server of claim 11, wherein the processor is further configured to execute the one or more instructions to:
    identify a selected community that is selected in the user device;

identify a content used by members of the selected community; and transmit, to the user device, information about the content used by the members of the selected community.

17. The server of claim 11, wherein the processor is further configured to execute the one or more instructions to:
obtain a plurality of usage histories of a plurality of devices, respectively; and
determine the plurality of device groups based on clustering the plurality of devices into groups of devices having a similar usage history.

18. The server of claim 11, wherein the processor is further configured to execute the one or more instructions to generate the user-customized community list so that the at least one first community and the at least one second community are displayed differently in the user-customized community list, and community information of each community in the user-customized community list is displayed together.

19. The server of claim 14, wherein the processor is further configured to execute the one or more instructions to add the third community so that the third community is maintained after the members of the third community terminate use of the first content.

20. A non-transitory computer-readable recording medium for storing computer readable program code or instructions which are executable by a processor to perform a method of generating a user-customized community list, the method comprising:

obtaining, from a user device, a usage history of the user device;

identifying a device group corresponding to the user device from a plurality of device groups, based on the usage history of the user device;

obtaining a community list comprising at least one community corresponding to the device group, each community in the community list providing a communication service between members of the respective community;

identifying content information corresponding to a first content being used in the user device;

generating the user-customized community list based on the content information and the community list, the user-customized community list comprising at least one first community corresponding to the first content, and at least one second community associated with the first content; and transmitting the user-customized community list to the user device.

\* \* \* \* \*